US011876445B2

United States Patent
Zhou et al.

(10) Patent No.: US 11,876,445 B2
(45) Date of Patent: Jan. 16, 2024

(54) TRANS-INDUCTANCE MULTI-PHASE POWER CONVERTERS AND CONTROL

(71) Applicant: Infineon Technologies Austria AG, Villach (AT)

(72) Inventors: Yong Zhou, Providence, RI (US); Danny Clavette, Greene, RI (US); Jens A. Ejury, Fremont, CA (US); Prasan Kasturi, Sharon, MA (US); Kushal Kshirsagar, Warwick, RI (US)

(73) Assignee: Infineon Technologies Austria AG, Villach (AT)

( * ) Notice: Subject to any disclaimer, the term of this patent is extended or adjusted under 35 U.S.C. 154(b) by 201 days.

(21) Appl. No.: 17/062,819

(22) Filed: Oct. 5, 2020

(65) Prior Publication Data

US 2022/0109368 A1 Apr. 7, 2022

(51) Int. Cl.
*H02M 3/155* (2006.01)
*H02M 1/32* (2007.01)
*H02M 1/00* (2006.01)

(52) U.S. Cl.
CPC ............ *H02M 3/155* (2013.01); *H02M 1/32* (2013.01); *H02M 1/0009* (2021.05)

(58) Field of Classification Search
CPC .... H02M 1/0064; H02M 1/0084; H02M 1/14; H02M 1/15; H03M 3/158; H03M 3/1584; H03M 3/1586; H03M 3/1588; H03M 3/04
See application file for complete search history.

(56) References Cited

U.S. PATENT DOCUMENTS

| 3,984,799 A | * | 10/1976 | Fletcher | H02M 3/1584 |
| | | | | 363/21.08 |
| 4,245,386 A | * | 1/1981 | Kausche | H01L 31/046 |
| | | | | 438/92 |
| 5,663,874 A | * | 9/1997 | Mader | H02M 3/33561 |
| | | | | 363/21.13 |
| 5,790,005 A | | 8/1998 | Santi et al. | |
| 6,343,026 B1 | * | 1/2002 | Perry | H02M 3/285 |
| | | | | 323/272 |

(Continued)

FOREIGN PATENT DOCUMENTS

| CN | 106024347 | * 10/2016 |
| CN | 106160544 | * 10/2016 |

(Continued)

OTHER PUBLICATIONS

Kunrong Wang et al., "Modeling Design Considerations of Coupled Inductor Converters", Jan. 20, 2021, IEEE Explore (Year: 2021).*

(Continued)

*Primary Examiner* — Kevin J Comber
*Assistant Examiner* — Nusrat Quddus
(74) *Attorney, Agent, or Firm* — Armis IP Law, LLC

(57) ABSTRACT

An apparatus such as a power supply includes a controller and multiple power converter phases. The controller controls operation of the multiple power converter phases to produce an output voltage that powers a load. The multiple power converter phases are coupled in parallel to convert an input voltage into an output voltage. The controller further controls a flow of current through a series circuit path connecting multiple windings of the multiple power converter phases to operate the power supply in different modes.

37 Claims, 11 Drawing Sheets

(56) References Cited

U.S. PATENT DOCUMENTS

| | | | | |
|---|---|---|---|---|
| 6,366,069 B1* | 4/2002 | Nguyen | ............... | H02M 3/1563 |
| | | | | 323/272 |
| 6,714,426 B1* | 3/2004 | Guo | .................... | H02M 3/1584 |
| | | | | 363/25 |
| 6,822,427 B2 | 11/2004 | Wittenbreder | | |
| 6,828,762 B2* | 12/2004 | Brkovic | ............ | H02M 3/33571 |
| | | | | 323/266 |
| 7,064,530 B2 | 6/2006 | Vogman | ............ | H02M 3/33569 |
| | | | | 323/267 |
| 7,176,658 B2* | 2/2007 | Quazi | .................... | B60L 50/10 |
| | | | | 322/24 |
| 7,233,132 B1* | 6/2007 | Dong | .................... | H02M 3/1584 |
| | | | | 323/272 |
| 7,251,113 B1 | 7/2007 | Batarseh et al. | | |
| 7,449,867 B2* | 11/2008 | Wu | .................... | H02M 3/1584 |
| | | | | 323/272 |
| 7,630,221 B2* | 12/2009 | Sui | .................... | H02M 1/4208 |
| | | | | 323/207 |
| 7,667,440 B2* | 2/2010 | Qiu | .................... | H02M 3/1584 |
| | | | | 323/262 |
| 7,791,321 B2* | 9/2010 | Xu | .................... | H02M 3/1584 |
| | | | | 323/361 |
| 8,068,355 B1* | 11/2011 | Ikriannikov | .......... | H02M 3/285 |
| | | | | 363/16 |
| 8,610,414 B2* | 12/2013 | Fuma | .................... | H02M 3/1584 |
| | | | | 323/272 |
| 8,704,500 B2* | 4/2014 | Xiao | .................... | H02M 3/1584 |
| | | | | 323/272 |
| 8,901,897 B2* | 12/2014 | Barnette | ............ | H02M 3/1584 |
| | | | | 323/225 |
| 8,957,514 B1* | 2/2015 | Barnette | .................... | H02M 3/00 |
| | | | | 257/691 |
| 8,975,884 B2* | 3/2015 | Hulsey | .................... | H02M 3/1584 |
| | | | | 363/59 |
| 9,037,884 B2* | 5/2015 | Rahardjo | .................... | G05F 1/66 |
| | | | | 323/212 |
| 9,041,373 B2* | 5/2015 | Jiang | .................... | H03K 17/16 |
| | | | | 323/283 |
| 9,041,504 B2* | 5/2015 | Helmreich | .......... | H02M 3/1584 |
| | | | | 336/170 |
| 9,219,422 B1* | 12/2015 | Barnette | .................... | H01F 3/14 |
| 9,270,178 B2* | 2/2016 | Jiang | .................... | H02M 3/157 |
| 9,379,619 B2 | 6/2016 | Barnette | | H02M 3/33507 |
| 9,496,792 B2* | 11/2016 | Ouyang | .................... | H02M 3/1584 |
| 9,559,586 B2* | 1/2017 | Ouyang | .................... | H02M 3/158 |
| 9,618,539 B2* | 4/2017 | Barnette | .................... | G01R 15/146 |
| 9,917,510 B2* | 3/2018 | Ahmed | .................... | H02M 3/07 |
| 9,941,784 B1* | 4/2018 | Li | .................... | G01R 15/183 |
| 10,003,266 B2* | 6/2018 | Breen | .................... | G06F 9/4403 |
| 10,170,986 B2* | 1/2019 | Childs | .................... | H02M 3/1588 |
| 10,348,197 B2* | 7/2019 | Liu | .................... | H02M 3/156 |
| 10,498,241 B2* | 12/2019 | Wu | .................... | G01R 29/0273 |
| 10,516,337 B2* | 12/2019 | Ojika | .................... | H02M 3/155 |
| 10,651,721 B2* | 5/2020 | Wu | .................... | H02M 3/1584 |
| 10,725,938 B2* | 7/2020 | Jiang | .................... | G05F 1/10 |
| 10,917,013 B2* | 2/2021 | Melanson | .................... | H01F 27/28 |
| 10,996,732 B2* | 5/2021 | Luo | .................... | G05F 1/465 |
| 11,063,508 B2* | 7/2021 | Lu | .................... | H02M 3/1584 |
| 11,063,514 B2* | 7/2021 | Rosolowski | .................... | H04B 1/40 |
| 11,223,276 B1* | 1/2022 | Cai | .................... | H02M 3/158 |
| 11,283,358 B2* | 3/2022 | Lu | .................... | H03K 19/20 |
| 11,303,204 B1* | 4/2022 | Zhao | .................... | H02M 1/0043 |
| 11,368,095 B1* | 6/2022 | Gupta | .................... | H02M 3/33507 |
| 11,402,414 B2* | 8/2022 | Bolus | .................... | G01R 19/25 |
| 11,451,145 B2* | 9/2022 | Shao | .................... | H02M 1/0064 |
| 11,476,763 B2* | 10/2022 | Chang | .................... | H02M 3/1584 |
| 2002/0136029 A1 | 9/2002 | Ledenev et al. | | |
| 2003/0016545 A1* | 1/2003 | Jutras | .................... | H02M 3/1588 |
| | | | | 363/18 |
| 2004/0080965 A1 | 4/2004 | Poon et al. | | |
| 2004/0145928 A1* | 7/2004 | Takada | .................... | H02M 3/158 |
| | | | | 363/95 |
| 2004/0190312 A1* | 9/2004 | Takada | .................... | H02M 3/335 |
| | | | | 363/21.12 |
| 2005/0073288 A1* | 4/2005 | Harris | .................... | H02J 1/102 |
| | | | | 323/282 |
| 2005/0207180 A1* | 9/2005 | Pansier | .................... | H02M 3/01 |
| | | | | 363/16 |
| 2006/0049814 A1* | 3/2006 | Drobnik | ................ | H02M 3/158 |
| | | | | 323/282 |
| 2007/0046270 A1* | 3/2007 | Tsuruya | .................... | H02M 3/1582 |
| | | | | 323/247 |
| 2007/0176585 A1* | 8/2007 | He | .................... | H02M 3/1584 |
| | | | | 323/282 |
| 2008/0019158 A1 | 1/2008 | Wu et al. | | |
| 2009/0001945 A1* | 1/2009 | Wickersham | ....... | H02M 3/1584 |
| | | | | 323/263 |
| 2009/0327786 A1* | 12/2009 | Carroll | .................... | H02M 3/157 |
| | | | | 713/340 |
| 2011/0140679 A1* | 6/2011 | Xu | .................... | H02M 3/158 |
| | | | | 323/290 |
| 2011/0169811 A1 | 7/2011 | Nagaki | | |
| 2012/0286750 A1* | 11/2012 | Xu | .................... | H02M 3/156 |
| | | | | 323/282 |
| 2014/0022828 A1* | 1/2014 | Metzler | .................... | H02M 1/12 |
| | | | | 363/44 |
| 2014/0070885 A1* | 3/2014 | Frium | .................... | H03F 3/185 |
| | | | | 330/251 |
| 2014/0132237 A1 | 5/2014 | Barnette et al. | | |
| 2015/0002126 A1* | 1/2015 | Ouyang | .................... | H02M 3/1584 |
| | | | | 323/304 |
| 2016/0072393 A1* | 3/2016 | McIntyre | .................... | H02M 3/1582 |
| | | | | 363/21.1 |
| 2016/0187386 A1* | 6/2016 | El-Damak | .................... | G01R 19/10 |
| | | | | 324/126 |
| 2016/0359326 A1* | 12/2016 | Sun | .................... | H02J 3/10 |
| 2016/0380548 A1* | 12/2016 | Liu | .................... | H02M 3/33546 |
| | | | | 363/21.02 |
| 2017/0373592 A1 | 12/2017 | Takahashi et al. | | |
| 2018/0013348 A1* | 1/2018 | Paul | .................... | H02M 3/157 |
| 2018/0152104 A1* | 5/2018 | Babazadeh | ........... | H02M 1/084 |
| 2018/0152107 A1 | 5/2018 | Childs | | |
| 2019/0165689 A1* | 5/2019 | Soto | .................... | H02M 7/493 |
| 2019/0280590 A1 | 9/2019 | Lee et al. | | |
| 2019/0348912 A1 | 11/2019 | Philip et al. | | |
| 2020/0088769 A1* | 3/2020 | Jin | .................... | H02M 3/33576 |
| 2020/0169170 A1* | 5/2020 | Zhang | .................... | H02M 3/1584 |
| 2020/0244175 A1* | 7/2020 | Mahdavikhah-Mehrabad | | ............ |
| | | | | H02M 3/33569 |
| 2021/0099084 A1* | 4/2021 | Cheng | .................... | H02M 3/1584 |
| 2021/0226536 A1* | 7/2021 | Couleur | .................... | H02M 1/0025 |
| 2021/0384821 A1* | 12/2021 | Chen | .................... | H02M 3/158 |
| 2022/0216788 A1* | 7/2022 | Chang | .................... | H02M 1/0064 |
| 2022/0216793 A1* | 7/2022 | Shao | .................... | H02M 3/1566 |
| 2022/0376600 A1* | 11/2022 | Jong | .................... | H02M 1/0009 |
| 2022/0376620 A1* | 11/2022 | Jong | .................... | H02M 1/0009 |
| 2022/0415558 A1* | 12/2022 | Nan | .................... | H01F 27/24 |
| 2023/0049859 A1* | 2/2023 | Capetillo | ............ | H02M 1/0064 |
| 2023/0194625 A1* | 6/2023 | Zafarana | .................... | G01R 31/62 |
| | | | | 324/764.01 |
| 2023/0253146 A1* | 8/2023 | Miao | .................... | H01F 27/292 |
| | | | | 336/221 |

FOREIGN PATENT DOCUMENTS

| | | | |
|---|---|---|---|
| CN | 205726639 | * | 10/2016 |
| CN | 106160544 A | | 11/2016 |
| CN | 205751837 | * | 11/2016 |
| CN | 108900083 A | | 11/2018 |

OTHER PUBLICATIONS

Oraw Bradley et al., "Lossless DCR Current Sensing for Multi-Winding Coupled Inductors", IEEE 30th International Telecommunications Energy Conference (INTELEC), 2008, 6pgs. (Year: 2008).*

Xu Ming et al., "Novel Coupled-Inductor Multi-Phase VRS", 22nd Annual IEEE Applied Power Electronics Conference & Expositions (APEC), 2007, p. 113-119 (Year: 2007).*

(56) References Cited

OTHER PUBLICATIONS

Technical Disclosure Commons, Defensive Publication Series, "Fast Multiple-Phase Trans-Inductor Voltage Regulator", May 9, 2019, pp. 1-15.
N/A, "Fast multi-phase trans-inductor voltage regulator", Technical Disclosure Commons, May 9, 2019, pp. 1-15, https://www.tdcommons.org/dpubs_series/2190.
Extended Search Report, EP 21 19 9646, dated Feb. 9, 2021, pp. 1-9.
EP Extended Search Report, EP 20201383.5, dated Feb. 25, 2021, pp. 10.
Office Action, EP 21 199 646.7, dated Apr. 18, 2023, pp. 1-7.

\* cited by examiner

TRANS-INDUCTANCE MULTI-PHASE POWER CONVERTERS AND CONTROL

BACKGROUND

There are multiple types of switching power converters. For example, one type of conventional switching power converter is a buck converter. In general, to maintain an output voltage within a desired range, a controller associated with the buck converter compares the magnitude of a generated output voltage to a setpoint reference voltage. Based on a respective error voltage, the controller modifies a respective switching frequency and/or pulse width modulation associated with activating high side switch circuitry or low side switch circuitry in the buck converter.

Another type of power converter is a so-called Trans-Inductor Voltage Regulator (TLVR). In general, a TLVR includes multiple power converter phases, each of which includes a multi-winding transformer. A first winding of each power converter phase (such as a buck converter configuration) is connected in series, providing coupling amongst the multiple phases. A second winding of each phase contributes to producing a respective output voltage the powers a load.

BRIEF DESCRIPTION

Implementation of clean energy (or green technology) is very important to reduce our impact as humans on the environment. In general, clean energy includes any evolving methods and materials to reduce an overall toxicity of energy consumption on the environment.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, etc. Regardless of whether energy is received from green energy sources or non-green energy sources, it is desirable to make most efficient use of raw energy provided by such systems to reduce our impact on the environment. This disclosure contributes to reducing our carbon footprint (and green energy) via more efficient energy conversion.

Embodiments herein include novel ways of implementing a power supply that powers a load.

More specifically, embodiments herein include an apparatus and/or system including a controller. The controller is operative to control operation of multiple power converter phases in a respective voltage regulator. The multiple power converter phases are coupled in parallel to convert an input voltage into an output voltage. Each of the multiple power converter phases incudes multiple transformer windings. The controller is further operative to control a flow of current through a series circuit path connecting multiple windings of the multiple power converter phases.

Controlling the flow of current through the series circuit path as described herein enables the controller to operate the power converter phases in multiple different operational modes.

For example, in one embodiment, the controller prevents or reduces an amount of current though the series circuit path to decouple an effective connectivity of the multiple windings and corresponding multiple power converter phases from each other. In other words, providing an open circuit in the series circuit path enables the power converter phases to operate independently of each other.

The controller can be configured to operate in a reduced current mode in response to a detected over-current condition or a low current consumption condition in which the multiple power converter phases collectively provide a low current output to a load. Thus, a high or low current consumption condition can be configured to cause the controller to provide an open circuit condition to the series circuit path.

Additionally, or alternatively, the controller controls (adjusts) the flow of current through the series circuit path to adjust a parameter such as a control loop bandwidth of the power supply and corresponding multiple power converter phases.

Controlling the flow of current through the series circuit path as described herein can be achieved in multiple different ways. For example, in one embodiment, the controller controls a magnitude of one or more resistive components disposed in series with the series circuit path. In one embodiment, the controller monitors a magnitude of current through the series circuit path connecting the multiple windings or the magnitude of current supplied by the output voltage; the controller controls the flow of the current through the series circuit path based on a magnitude of the monitored current.

In still further example embodiments, the controller reduces the flow of current through the series circuit path connecting the multiple power converter phases in response to detecting that the magnitude of the monitored current through the series circuit path or output current provided to a load from one or more of the power converter phases is greater than a threshold value.

In accordance with further embodiments, the windings of the corresponding phases are first windings of the multiple power converter phases connected in series. Each of the multiple power converter phases includes a first winding and a second winding. In such an embodiment, each of the second windings of the multiple power converter phases produces, based on control signals from the controller, output current contributing to generation of an output voltage that powers a load.

The windings of the multiple power converter phases can be implemented in any suitable manner. In one embodiment, the windings in each of the multiple power converter phases is a transformer winding. The controller controls the current through the series circuit path via switch circuitry disposed in series with the series circuit path connecting the multiple transformer windings. Setting of the switch circuitry to an open circuit state decouples connectivity of the multiple power converter phases from each other so they operate independently.

As previously discussed, further embodiments herein include, via the controller, varying a control loop bandwidth of the respective power supply including multiple power converter phases. In one embodiment, control of the flow of current through the series circuit path includes controlling a resistive component disposed in series with the series circuit path; a setting of the resistive component controls a magnitude of the current through the series circuit path. In such an instance, the control loop bandwidth is inversely proportional to a magnitude of the resistive component. For example, a reduction in a magnitude of the resistive component increases a magnitude of the control loop bandwidth of the power converter phases; an increase in a magnitude of the resistive component decreases a magnitude of the control loop bandwidth of the power converter phases.

Still further embodiments herein include, via the controller, reducing the flow of current through the series circuit path of the multiple windings in response to a condition in which a magnitude of current supplied by the output voltage to power a load is below a threshold value. As previously discussed, the controller can be configured to operate in such a mode to operate fewer-than-all of the power converter phases to produce the output voltage because not all power converter phases are needed to produce a small current.

In one embodiment, the controller implements first PID (Proportional-Integral-Derivative) settings in a PID controller that controls a first power converter phase of the multiple power converter phases while in a first more in which the controller operates more than two of the multiple power converter phases to produce the output voltage prior to reducing the flow of current through the series circuit path connecting the multiple windings. The controller implements second PID (Proportional-Integral-Derivative) settings in the PID controller of the first power converter phase subsequent to reducing the flow of current through the series circuit path connecting the multiple windings. In other words, the controller applies the second PID settings to control of the first power converter phase when activating only a single power converter phase to produce the output voltage as opposed to applying first PID settings to the first power converter phase when all power converter phases are simultaneously activated in a normal mode.

Thus, the multiple power converter phases can be configured to include one or more series switches (such as MOSFETs) in an Lc loop (first loop) to disable the current coupling windings (inductors) in a multiphase TLVR topology to achieve higher light load efficiency and more robust over-current fault response. Additionally, or alternatively, the series switches can be combined with a parallel resistor or RL (resistor-inductor) network to modulate a respective loop bandwidth of the power supply. Additionally, or alternatively, the controller implements another control loop to operate each of the individual power converter phases.

These and other more specific embodiments are disclosed in more detail below.

Note that although embodiments as discussed herein are applicable to power converters, the concepts disclosed herein may be advantageously applied to any other suitable topologies as well as general power supply control applications.

Note that any of the resources as discussed herein can include one or more computerized devices, controller, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, etc., that support operations as discussed herein.

One embodiment herein includes a computer readable storage medium and/or system having instructions stored thereon. The instructions, when executed by computer processor hardware, cause the computer processor hardware (such as one or more co-located or disparately located processor devices) to: control operation of multiple power converter phases in a voltage regulator (power supply), the multiple power converter phases coupled in parallel to convert an input voltage into an output voltage; and control a flow of current through a series circuit path connecting multiple windings of the multiple power converter phases.

The ordering of the steps above has been added for clarity sake. Note that any of the processing operations as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of implementing one or more inductor components to deliver current to a load. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
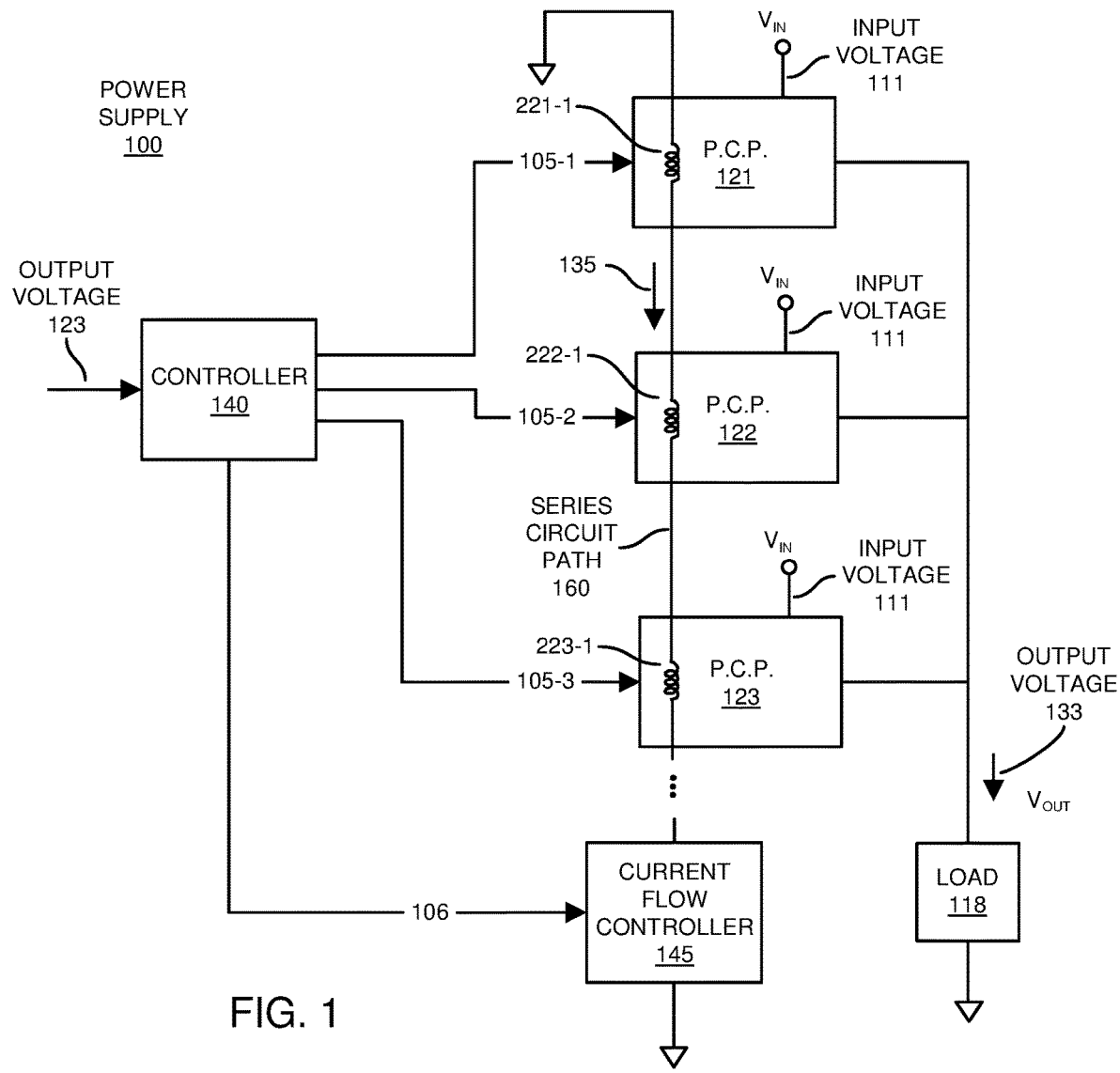
FIG. 1 is an example general diagram of a power system (power supply) including multiple inductive phases connected in series according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As previously discussed, embodiments herein are directed to multiphase power conversion stages powering computing processors via a so-called Trans-Inductor Voltage Regulator (TLVR) topology. Due to higher power demand from ASICs/CPUs/GPUs in machine learning accelerators, network switches and servers, the phase count and current demand from a multiphase Voltage Regulator Module (VRM) keeps increasing, meanwhile more output decoupling capacitors are required to address the more stringent transient performance requirement. Further, due to the bandwidth limitation by its large output inductance of the conventional multiphase VRM, the path of increasing phase count and adding more output decoupling capacitors will increase fabrication costs as well as board space.

As previously discussed, the conventional TLVR topology significantly increases the loop bandwidth and total output current slew rate by replacing the discrete phase inductor with a 1:1 transformer consisting of two tightly coupled windings. A secondary winding of the transformer acts as the phase inductor same as conventional multiphase VRM, the primary windings are interconnected in a series loop with an additional compensation inductor Lc and then terminated to grounds on both sides which allows bidirectional current flow. During a transient event, the duty cycle adjustment on any phase will cause a current change in the Lc loop, which will be eventually reflected to all the other phase currents. The total current slew rate is greatly boosted and equivalent total output inductance is significantly reduced, this results in better transient response and fewer output decoupling capacitors.

However, the phase current coupling mechanism of TLVR induces additional AC ripple current in the Lc series loop both at steady state and with dynamic load, this additional AC ripple current is also superimposed on phase magnetizing current therefore the overall phase current ripple increases. This means higher RMS current so higher conduction loss, furthermore, the magnetic AC core loss also increases.

As further discussed herein, LC ripple current (such as in FIG. 3), phase magnetizing current, and total phase current of a typical N-phase TLVR design (such as where N=6). For a low power state mode assuming 1 active phase and 5 idle phases, the Lc loop AC ripple current will be reflected to all secondary windings and flow through the body diodes of respective switches (such as MOSFETs) in power stages among the disabled phases, inducing power dissipation wasted as heat as it is not related to any useful compute task. This deviates from the light load efficiency requirement of nearly all modern processors which has been effectively addressed by dropping phases in conventional multiphase VRM design, however it is not valid anymore for TLVR topology due to current reflection from the Lc loop.

Another potential risk due to phase current coupling mechanism of a conventional TLVR is the reflection of over-current from the faulty phase to good phases during abnormal condition, while this is not a concern for conventional multiphase VRM since phase currents are non-coupled and the faulty phase could be isolated from the other phases simply by disabling itself. The faulty phase might operate with the inductor being saturated, it is unavoidable to follow with excessive phase current caused by much faster di/dt as inductance falls down dramatically. The same amount of delta current will be very likely reflected to all the other phases through LC loop thereby causing over-current among all phases. The conventional TLVR topology does not provide techniques to limit LC AC current amplitude nor propose desired fault response upon excessive current coupling.

As further discussed herein, embodiments herein improve light load efficiency and over-current fault response robustness by deploying series switches in an LC loop, which could be driven by a logic command signal from a digital controller. In one embodiment, during normal operation, the series switches are constantly conducting (short circuit state or low resistance state) to not interfere with TLVR operation to benefit from the superior transient performance. The series one or more switches are turned OFF (to a respective open circuit, high impedance path) off (resulting in no current flow) in case of entering into low power state mode or detecting over-current among phases or within the Lc loop. As further discussed herein, depending on system complexity, one or two switches (such as series MOSFETs) can be used to block directional currents or one series switch to block only positive current. Specifically, series switch block the positive current and series switch blocks the negative current as further discussed herein.

Thus, the controller as described herein controls a flow of current through a series circuit path including multiple windings associated with each of multiple power converter phases. Controlling the flow of current through the series circuit path as described herein enables the controller to operate the power converter phases in multiple different modes.

For example, in a first mode, in response to detecting an over current condition of supplying current to a load, the controller prevents or reduces a flow of current through a series circuit path of multiple windings to decouple or disconnect the multiple windings and corresponding multiple power converter phases from each other, thereby reducing supplied current and transient response.

In a second mode, the controller detects a low current consumption mode in which all power converter phases are not needed to supply power to the load. In such an instance, the controller prevents or reduces a flow of current though the series circuit path to decouple or disconnect the multiple windings and corresponding multiple power converter phases from each other. During the reduced flow of current, the controller then activates fewer-than-all of the power converter phases (such as a single power converter phase) to produce an output voltage to power the load.

In a third mode, the controller controls (adjusts) the flow of current through the series circuit path resulting in adjustment of a parameter such as a control loop bandwidth of the power supply including multiple power converter phases.

Now, more specifically, FIG. 1 is an example general diagram of a power system including multiple inductor (winding) coupled phases according to embodiments herein.

In this example embodiment, the power supply 100 includes a controller 140, current flow controller 145 (such as one or more of a switch, switch circuitry, resistor, resistor network, etc.), and multiple power converter phases 121, 122, 123, etc.

During operation, the controller monitors a magnitude of the output voltage 133 produced by the multiple power converter phases 121, 122, 123, etc. To maintain the magnitude of the output voltage 133 in a desired voltage range, the controller produces control signals 105 (such as control signal 105-1, control signal 105-2, control 105-3, etc.) applied to each of the power converter phases.

For example, as generally shown, control signal 105-1 controls operation of power converter phase 121; control signal 105-2 controls operation of power converter phase 122; control 105-3 controls operation of power converter phase 123; and so on. Accordingly, embodiments herein include a controller 140 that controls operation of multiple power converter phases 121, 122, 123, etc., in a power supply 100 (voltage regulator). The multiple power converter phases 121, 122, 123, etc., are coupled in parallel to convert an input voltage 111 (a.k.a., Vin or DC voltage) into an output voltage 133 (such as a DC voltage) that powers the load 118. That is, each of the power converter phase (such as DC to DC converter) generates an output voltage that is supplied to the load 118. Collectively, the power converter phases produce the output voltage 133.

Each of the power converter phases 121, 122, 123, etc., includes respective winding to facilitate generation of the output voltage 133. For example, in this example embodiment, the power converter phase 121 includes winding 221-1; the power converter phase 122 includes winding 222-1; the power converter phase 123 includes winding 223-1; and so on.

As further shown, in addition to controlling operation of the power converter phases, via current flow controller 145, the controller 140 controls a flow of current 135 through a series circuit path 160 connecting multiple windings of the multiple power converter phases 121, 122, 123, etc. Additional details of instances of the power supply 100 and corresponding circuitry associated with the power converter phases is further discussed below. In general, the control of current 135 supports different operational modes as further discussed herein.

Note that controlling the flow of current 135 through the series circuit path 160 via the current flow controller 145 as described herein can be achieved in multiple different ways. For example, in one embodiment, the controller 140 controls a magnitude of a resistive component (such as current flow controller 145) disposed in series with the series circuit path 160. Additionally, or alternatively, the current flow controller 145 includes one or more switches operative to prevent and/or allow a flow of the current 135 through the series circuit path 160 and corresponding windings 221-1, 222-1, 223-1, etc.

Figure 2:
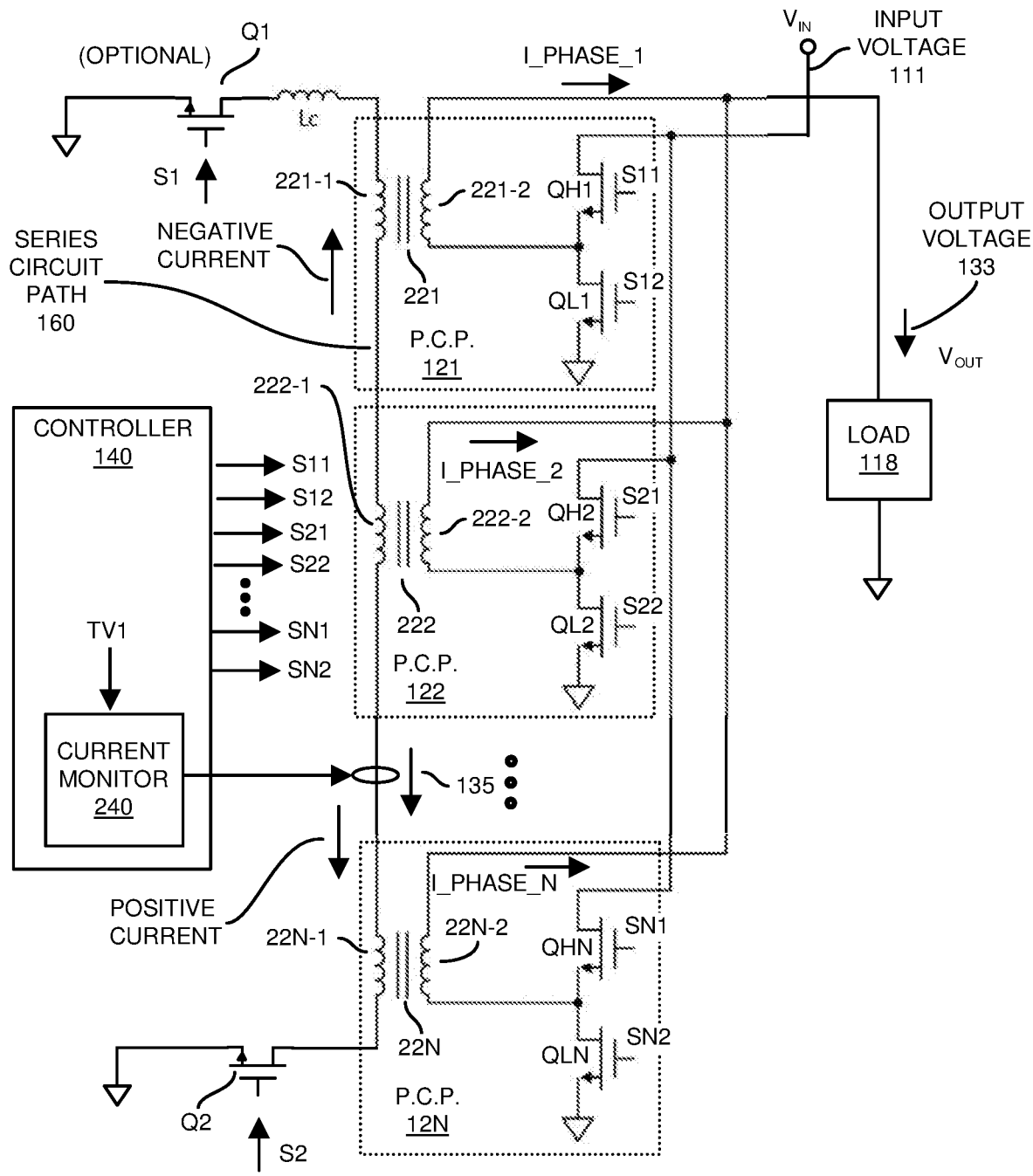
FIG. 2 is an example diagram illustrating a trans-inductance voltage regulator and corresponding controller controlling current flow according to embodiments herein.

FIG. 2 is a more detailed example diagram illustrating a trans-inductance voltage regulator and control of current through a series circuit path according to embodiments herein.

In this example embodiment, each of the power converter phases includes a pair of switches (such as high side switch circuitry and low side switch circuitry) and one or more windings to contribute to generation of the output voltage 133.

For example, the power converter phase 121 includes winding 221-2, switch QH1 (such as high side switch circuitry) controlled by signal S11 generated by the controller 140, and switch QL1 (such as low side switch circuitry) controlled by signal S12 generated by controller 140. Switch QH1 is connected in series with switch QL1 between the input voltage 111 and a ground reference. The drain of switch QH1 receives the input voltage 111; the source of QH1 is connected to the drain of switch QL1 and contributes to producing the output voltage 133; the source of QL1 is connected to ground.

The power converter phase 122 includes winding 222-2, switch QH2 (such as high side switch circuitry) controlled by signal S21 generated by the controller 140 and switch QL2 (such as low side switch circuitry) controlled by signal S22 generated by controller 140. Switch QH2 is connected in series between the input voltage 111 and a ground reference. The drain of switch QH2 receives the input voltage 111; the source of QH2 is connected to the drain of switch QL2 and contributes to producing the output voltage 133; the source of QL2 is connected to ground.

The power converter phase 12N (nth phase) includes winding 22N-2, switch QHN (such as high side switch circuitry) controlled by signal SN1 generated by the controller 140 and switch QLN (such as low side switch circuitry) controlled by signal SN2 generated by controller 140. Switch QHN is connected in series between the input voltage 111 and a ground reference. The drain of switch QHN receives the input voltage 111; the source of QHN is connected to the drain of switch QN1 and contributes to producing the output voltage 133; the source of QN1 is connected to ground.

In one embodiment, the controller 140 generates the control signals depending on a magnitude of the output voltage 133 with respect to a desired setpoint voltage as in buck converter or other suitable technology. In general, as in a buck converter topology, activation of corresponding high side switch circuitry in a respective power converter phase increases a magnitude of the output voltage 133; activation of the low side switch circuitry results in decreased current to the load from the energy stored in the inductor.

In one embodiment, the windings 221-1, 222-1, 22N-1, are first windings of the multiple power converter phases connected in series in the series circuit path 160. Each of the multiple power converter phases 121, 122, 12N, includes a first winding (such as primary winding) and a second winding (such as secondary winding). In such an embodiment, each of the second windings 221-2, 222-2, . . . , 22N-2, of the multiple power converter phases produces, based on control signals from the controller 140, respective phase output current (or voltage) contributing to generation of an output voltage 133 that powers a load 118.

For example, winding 221-2 produces/outputs current I_phase_1; winding 222-2 produces/outputs current I_phase_2; . . . ; winding 22N-2 produces/outputs current I_phase_N.

Figure 3:
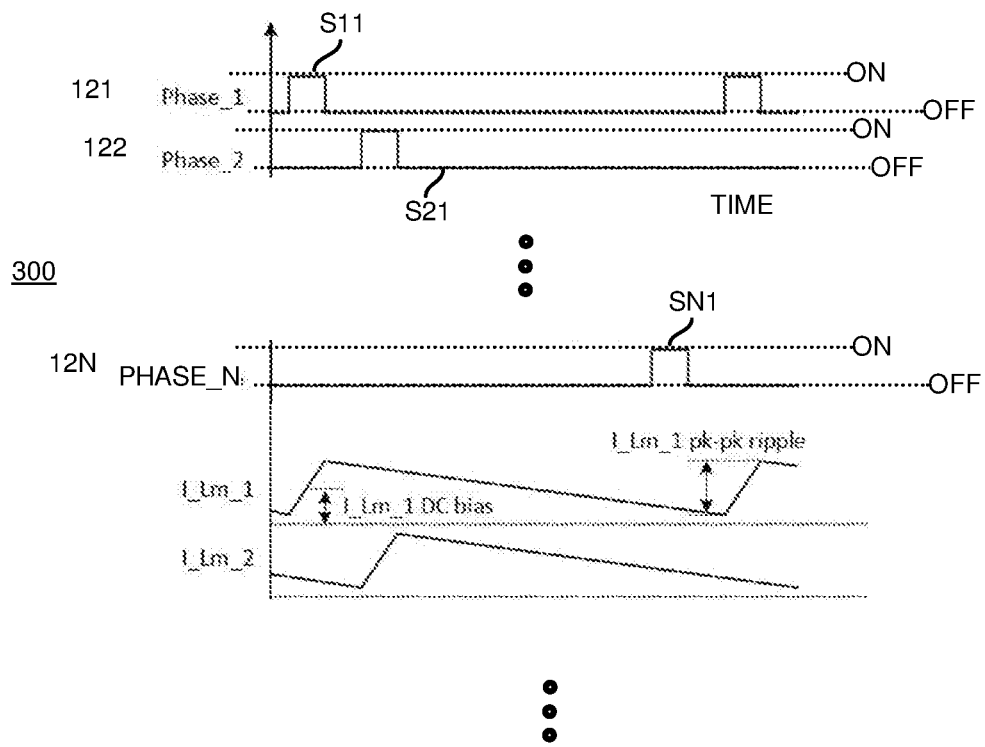
FIG. 3 is an example timing diagram illustrating control signals controlling operation of the trans-inductance voltage regulator according to embodiments herein.
Figure 3:
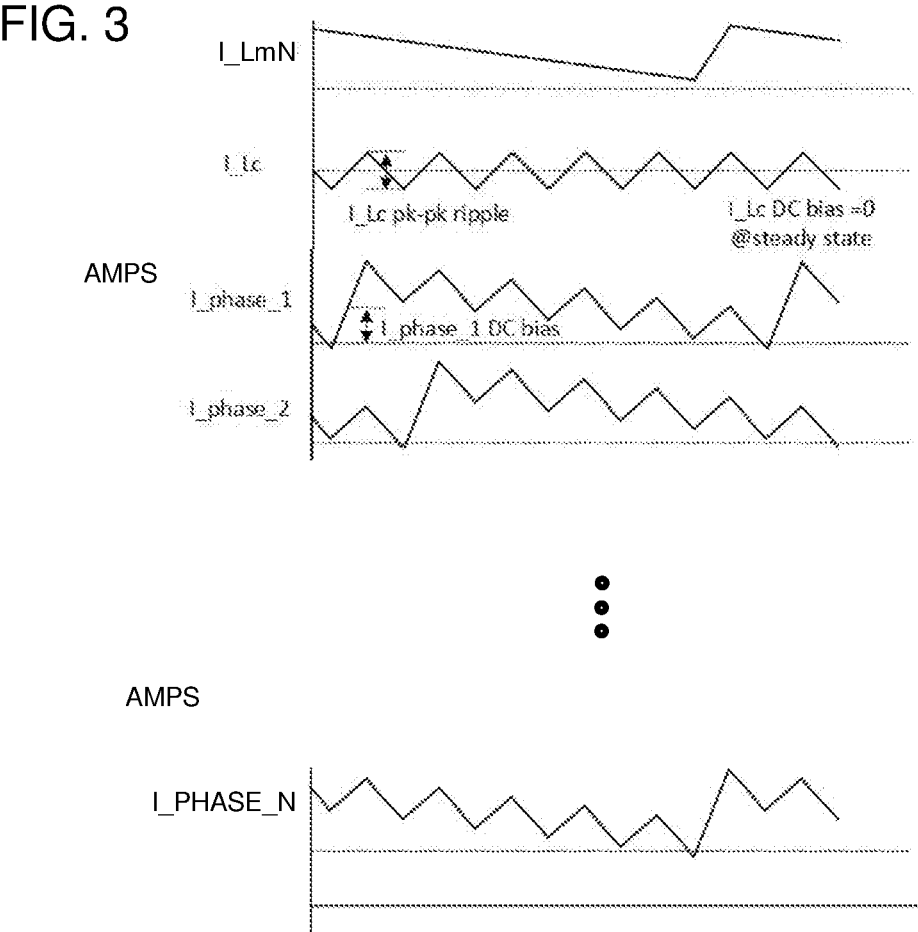

An example of control signals S11, S21, . . . , SN1 generated by the controller 140 over time is shown in timing diagram of FIG. 3. In one embodiment, the low side switch circuitry in a respective phase is activated when the corresponding high side switch circuitry is deactivated. The high side switch circuitry and low side switch circuitry are never activated at the same time. There is a dead time between activating the high side switch circuitry and low side switch circuitry.

In this example embodiment, power converter phase 121 represents phase_1 supplied to load 118; power converter phase 122 represents phase_2 supplied to load 118; . . . ; power converter phase 12N represents phase_N supplied to load 118.

Referring again to FIG. 2, as further shown, each power converter phase as described herein includes a respective transformer and pair of windings. For example, power converter phase 121 includes transformer 221 including winding 221-1 magnetically (inductively) coupled to the winding 221-2; power converter phase 122 includes transformer 222 including winding 222-1 magnetically (inductively) coupled to the winding 222-2; . . . ; power converter phase 12N includes transformer 22N including winding 22N-1 magnetically (inductively) coupled to the winding 22N-2.

In still further example embodiments, via the current monitor 240, the controller 140 monitors a magnitude of current 135 through the series circuit path 160 connecting the multiple windings 221-1, 222-1, . . . , 22N-1; the controller 140 controls the flow of the current 135 through the series circuit path based on a magnitude of the monitored current.

Current flow can be determined in any suitable manner. In one embodiment, the series circuit path 160 includes a series resistor component. In such an instance, the current monitor 240 determines the magnitude of the current 135 based on a voltage across the resistor as produced by the flow of current 135 through the resistor. In one embodiment, the Rds-ON resistance of the switch S1 and/or S2 is used to determine current 135. Additionally, or alternatively, embodiments herein include implementing an Lc DCR current sensing, where a series RC network is placed across the inductor Lc to sense a magnitude of current.

In still further example embodiments, the controller 140 reduces or prevents the flow of current 135 through the series circuit path 160 connecting the multiple power converter phases in response to detecting that the magnitude of the monitored current 135 through the series circuit path 160 or output current provided by the output voltage 133 to the load 118 from one or more of the power converter phases is greater than a respective threshold value (such as TV1). Thus, if the output voltage 133 is shorted to ground by accident, the controller 140 detects an overcurrent condition and reduces or prevents current 135 from flowing through the series circuit path 160.

The controller 140 controls the current 135 through the series circuit path 160 via switch circuitry Q1 and/or Q2 (via signals S1 and/or S2) disposed in series with the series circuit path 160 connecting the multiple transformer windings 221-1, 222-1, . . . , 22N-1 in series.

For example, in one embodiment, when there is no over current condition, the controller 140 sets both switches S1 and S2 to an ON state during which the resistance of the respective switches is low (providing an electrically condition path). In such an instance, the combination of the windings 221-1, 222-1, . . . , 22N-1 in series enables a high flow of current and high transient response.

Figure 5A:
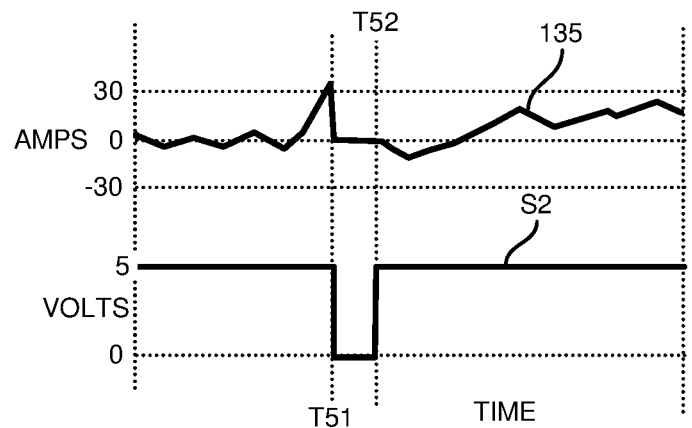
FIG. 5A is an example timing diagram illustrating power converter phase control based on monitoring current through a series circuit path according to embodiments herein.
Figure 5B:
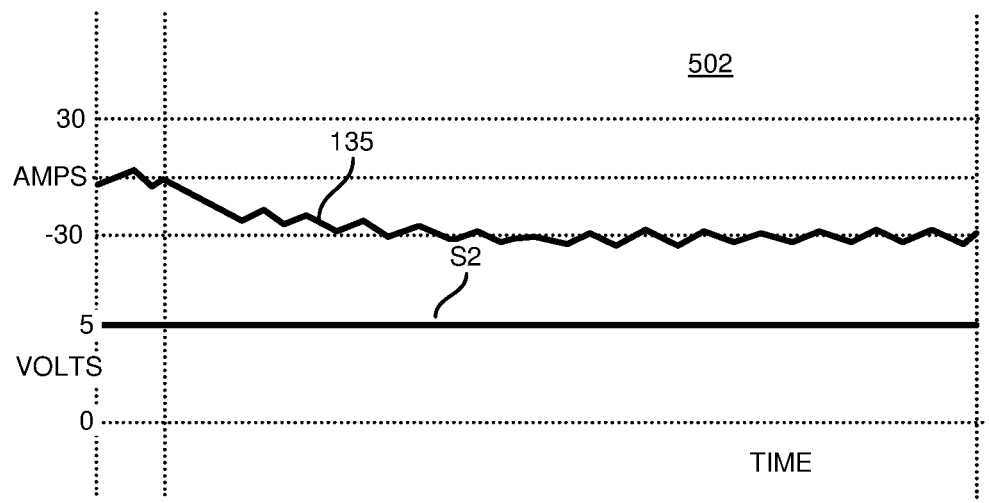
FIG. 5B is an example timing diagram illustrating power converter phase control of a respective control signal based upon monitoring current through a series circuit path according to embodiments herein.

During a high current condition as shown in FIGS. 5A and 5B, setting of the switch circuitry such as one or more of switches Q1 and Q2 to an open circuit (OFF) state decouples or effectively disconnects the multiple power converter phases from each other. For example, opening of switch S1 prevents flow of negative current as shown; opening of switch S2 prevents flow of positive current.

Figure 4:
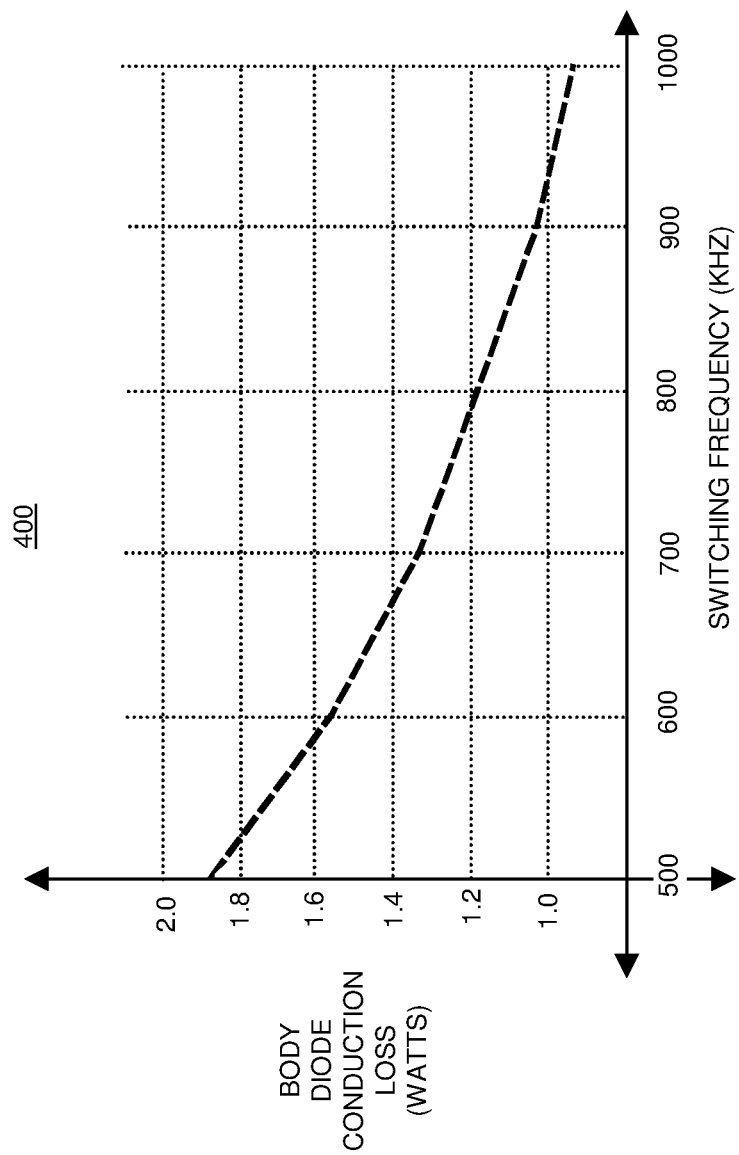
FIG. 4 is an example graph illustrating body diode conduction loss versus switching frequency according to embodiments herein.

FIG. 4 is an example graph illustrating body diode conduction loss versus switching frequency according to embodiments herein.

In one embodiment, in an example embodiment including 6 power converter phases (such as N=6), given the predefined low power state mode with 1 active phase and 5 idle phases, assuming VIN=12V, VOUT=1V, IOUT=10 A, Lm=100 nH, Lc=100 nH, Fsw=500 kHz, the Lc loop AC ripple current pk-pk is calculated as 1.85 Amps, its RMS (Root Mean Square) value is 0.53 A (Amperes). For a typical body diode forward voltage drop of 0.7V, the total power dissipation of body diodes is 1.87 W for the 5 idle phases, this represents an efficiency loss of 18.7%. Additionally, the Lc loop AC ripple current will result in additional conduction loss due to Lc loop PCB (Printed Circuit Board trace) resistance as well as body diode circulating current loop PCB resistance. The ripple current flowing through magnetic core also generates core loss. However, both PCB resistive loss and magnetic core loss are much smaller compared to the body diode conduction loss so they are excluded here. The total body diode conduction loss with respect to switching frequency of the 5 idle phases for the typical 6-phase TLVR topology is plotted in graph 400 of FIG. 4. The total body diode conduction loss decreases as switching frequency increases due to lower ripple current in Lc loop, but switching related power loss will increase for higher switching frequency. So it is a design trade-off in terms of selecting the optimum switching frequency to meet both light load efficiency and normal operation efficiency targets.

By turning off the two series switches Q1 and Q2 (such as transistors, field effect transistors, etc.) and force Lc current to be zero, the body diode conduction loss will be eliminated and light load efficiency could be greatly improved. When only series switch Q2 (and there is no switch Q1) is implemented in the series circuit path 160, the negative current in Lc loop will continue flowing its freewheeling body diode so the efficiency improvement is cut to be half compared to the case with two series switches Q1 and Q2. However in both cases, the logic command signal to turn OFF the series switches Q1 and Q2 is the same one provided by multiphase digital controller, and the gate could be pulled back high to turn on series Q1 and Q2 to resume normal TLVR operation as soon as low power state mode is exited. This concept is applicable to the implementation of phase shedding/drop of 1, 2, 3, . . . , (N−1) phase/phases by switching the series switches Q1 and Q2 for a N-phase multiphase TLVR topology.

In one embodiment, for multiphase VRM, over-current protection is always desirable to prevent inductor saturation, thermal runaway and other undesired catastrophic faults. Conventionally, the PWM (pulse width modulation) pulse duration generated by controller 140 is truncated or tri-stated once phase over-current is detected. The phase current sense is typically very fast and protection is implemented in a cycle-by-cycle basis as a result of limited current slew rate. For the TLVR topology as described herein, the total current slew rate could be boosted by more than one order as a result of the AC step current in Lc loop responding to load transients. In one embodiment, the sampling rate of the digital controller and sampling via an analog-to-digital converter implemented by the current monitor 240 is faster to detect the current slew rate which normally requires faster clock frequency leading to a more expensive digital implementation. Therefore with existing digital controller architecture, there is a growing concern from relatively lower ADC (analog-to-digital converter) sampling rate, which indicates a higher chance of over-current spreading from faulty phase to all the other good phases unless the Lc loop current is directly monitored and well controlled.

Thus, certain embodiments herein are directed towards achieving direct Lc loop current control through the series MOSFET to improve system robustness. One goal is to limit the positive current since it will potentially lead to an over-current event of supplying current from the output voltage 133, the approach of sensing the voltage drop across the series switch Q2 (such as RDSOn) and switching it off once the positive current amplitude exceeds the maximum allowed threshold is illustrated in FIG. 5A. This feature could be implemented externally with analog circuit, or processed by digital controller. In one embodiment, the Lc loop current threshold should be set with sufficient headroom to be not falsely tripped under maximum load step in normal operation and meanwhile with just enough safe margin to be able to detect abnormal over-current event caused by faulty phases.

FIG. 5A is an example timing diagram illustrating generation of a respective control signal based upon monitoring current through a series circuit path according to embodiments herein.

As shown in timing diagram 501, the current monitor 240 monitors a magnitude of the current 135 (or magnitude of the output current from output voltage 133).

At time T51, the current monitor 240 detects that the magnitude of the current 135 is greater than the threshold value TV1=30 Amperes. In response to detecting such a condition, the controller 140 at least temporarily turns OFF switch Q2 (such as for a predetermined amount of time) between time T51 and time T52, reducing a magnitude of the output current supplied from the output voltage 133 to the load 118. Thus, if the output voltage 133 is connected to a load that draw current above a threshold value TV1, the controller 140 deactivates the one or more switches Q1 and Q2 to prevent an excessive flow of current from the output voltage 133.

FIG. 5B is an example timing diagram illustrating generation of a respective control signal based upon monitoring current through a series circuit path according to embodiments herein.

As shown in timing diagram 502, in the case of negative detected current, the controller 140 continues to activate the switches Q1 and Q2.

Figure 6:
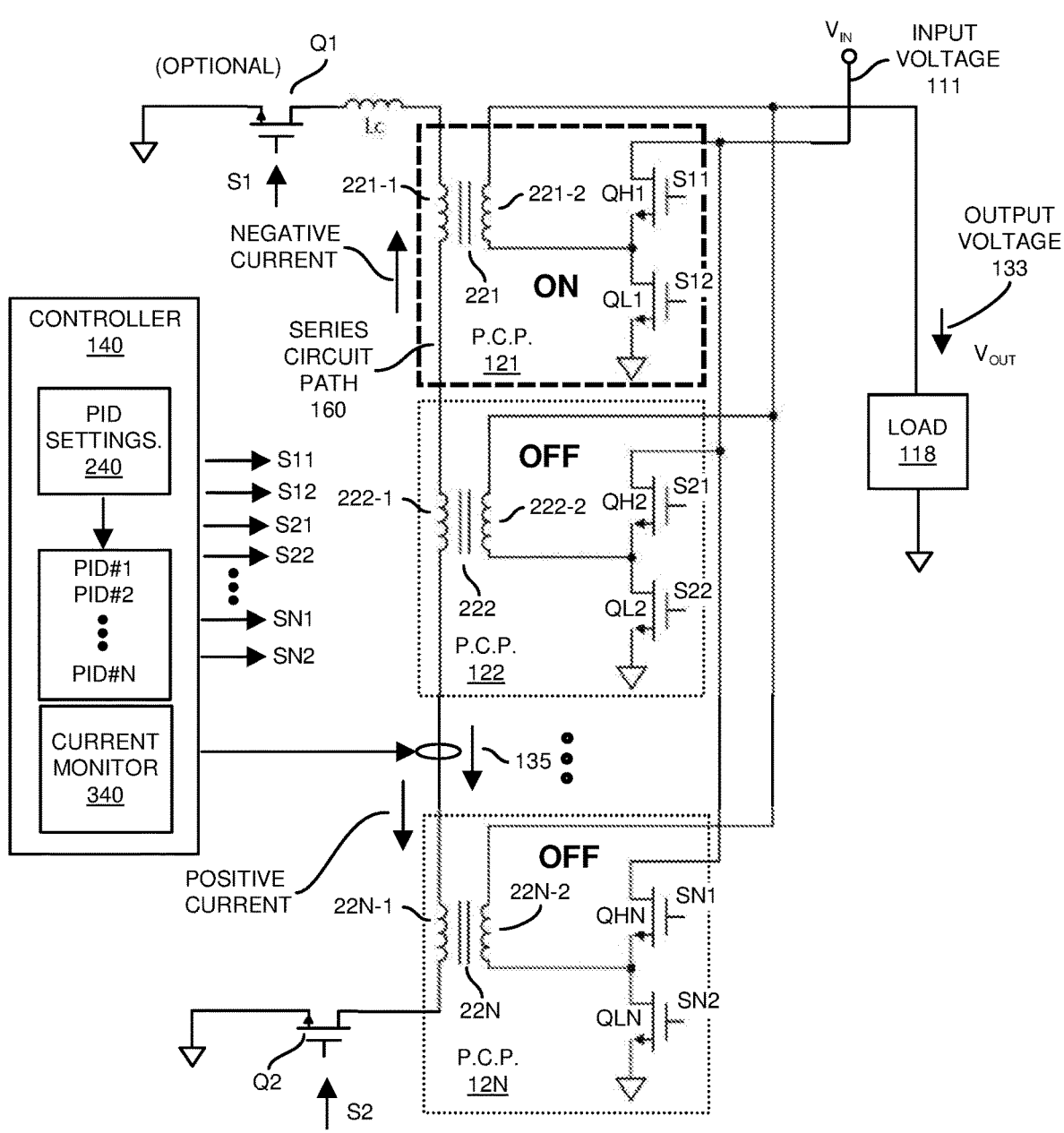
FIG. 6 is an example diagram illustrating phase control and control of current flow in a series circuit path of windings in a trans-inductance voltage regulator while in a low current output mode according to embodiments herein.

FIG. 6 is an example diagram illustrating control of current in a series circuit path of a trans-inductance voltage regulator while in a low current output mode according to embodiments herein.

As previously discussed, the controller 140 operates each of the power converter phases in FIG. 2 to produce the output voltage 133 to power the load 118. During non-overcurrent conditions of operating the multiple power converter phases, both switches Q1 and Q2 are set to an ON state, providing connectivity of both ends of the series circuit path 160 of windings 221-1, 222-1, . . . , 22N-1 to a ground reference voltage.

In one embodiment, the controller 140 is or includes one or more PID (Proportional-Integral-Derivative) controller that implements first PID settings (such as PID control coefficient P1, I1, and D1) to control the multiple power converter phases 121, 122, . . . , 12N to generate the output voltage 133 when all power converter phases are activated.

In accordance with further example embodiments, in response to detecting that the low current consumption by the load 118 (such as either monitoring the current 135 or current delivered by the output voltage 133 to the load 118), the controller activates only power converter phase 121 to produce the output voltage 133.

Thus, still further embodiments herein include, via the controller 140, reducing or preventing the flow of current 135 through the series circuit path 160 of the multiple windings in response to a condition in which a magnitude of current supplied by the output voltage to power a load is below a threshold value. In one embodiment, the controller determines a low output current supplied to the load via a magnitude of the current 135. As previously discussed, reducing or preventing the flow of current 135 through the series circuit path 160 decouples the power converter phases such that they operate more independently (or completely independently) with respect to other power converter phases.

As previously discussed, the controller 140 can be configured to operate in a low-current mode in which fewer-than-all of the power converter phases (such as just power converter phase 121) in the power supply 100 to produce the output voltage 133. Because current consumption is low, the power converter phase 121 is able to supply sufficient current to the load 118 while power converter phase 122 through power converter phase 12N are deactivated.

In one embodiment, the controller 140 implements first PID (Proportional-Integral-Derivative) settings (such as P1 coefficient to the proportional component of the PID controller, I1 coefficient to the integral component of the PID controller, D1 coefficient to the derivative component of the PID controller) in a PID controller that controls a first power converter phase 121 of the multiple power converter phases when all power converter phases are used to collectively generate the output voltage 133 prior to reducing the flow of current through the series circuit path 160 connecting the multiple windings 221-1, 222-1, . . . , 22N-1. In other words, as previously discussed, while implementing the first PID settings, the controller 140 activates both switches Q1 and Q2.

In response to detecting the low current consumption by the load 118 and switching to the low current consumption mode, the controller 140 deactivates switches Q1 and Q2 and implements second PID (Proportional-Integral-Derivative) settings (such as P2 coefficient to the proportional component of the PID controller associated with power converter phase 121, I2 coefficient to the integral component of the PID controller associated with the power converter phase 121, D2 coefficient to the derivative component of the PID controller associated with the power converter phase 121) in the PID controller functionality of the first power converter phase 121 subsequent to reducing the flow of current through the series circuit path connecting the multiple windings.

Thus, embodiments herein include switching PID settings applied to the power converter phase 121 depending on whether the power supply 100 operates in the low current consumption mode (power converter phases decoupled or operationally disconnected) or the normal mode in which the multiple power converter phases operate in an inductor coupled mode (switches Q1 and Q2 activated to an ON state).

Figure 7:
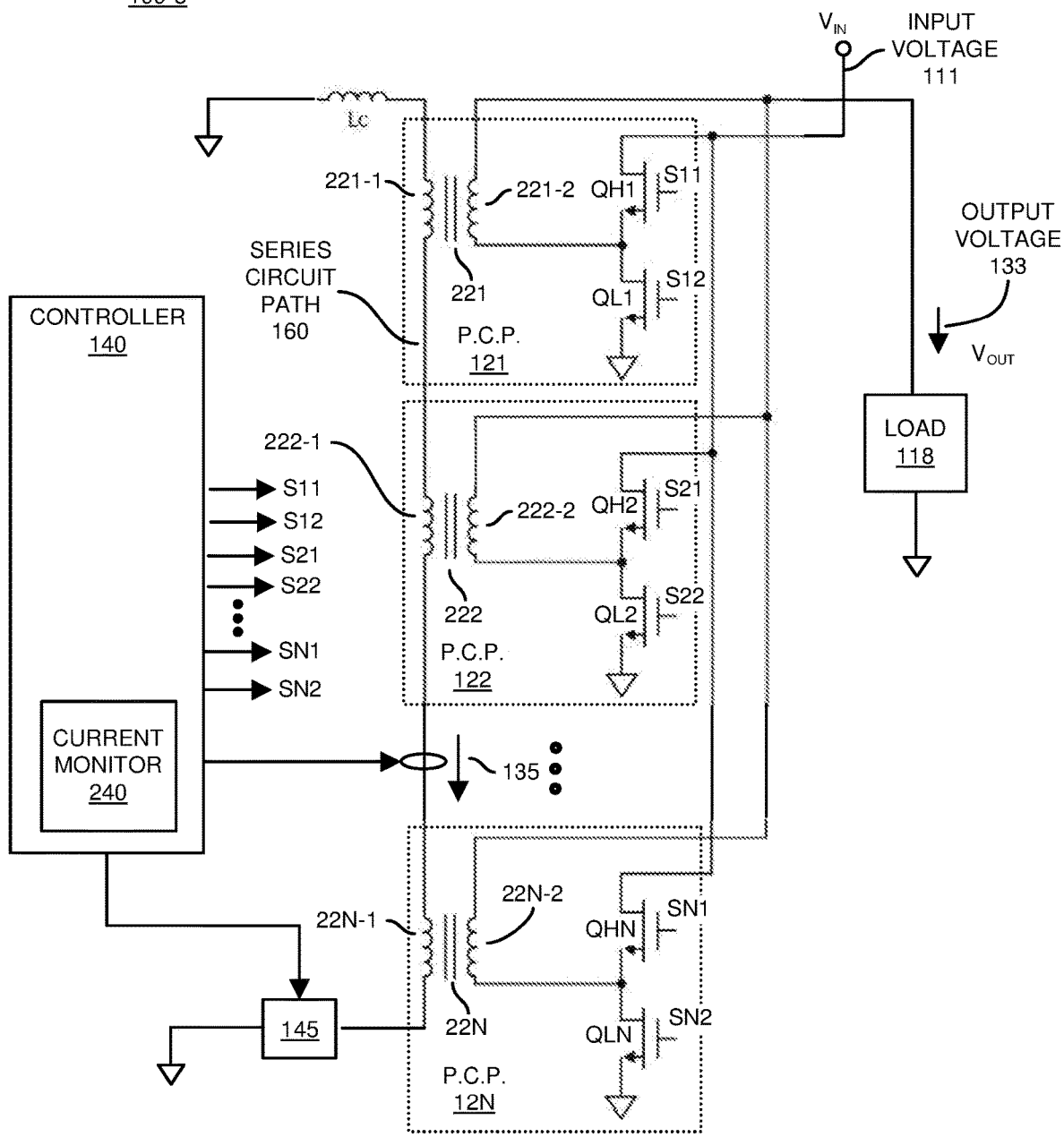
FIG. 7 is an example diagram illustrating control of current in a series circuit path of windings in a trans-inductance voltage regulator while in a loop bandwidth control mode according to embodiments herein.

FIG. 7 is an example diagram illustrating control of current in a series circuit path of a trans-inductance voltage regulator while in a loop bandwidth control mode according to embodiments herein.

Via current flow controller 145 such as a variable resistor, one or more switches, resistor network, etc., the controller 140 modulates (controls) the loop bandwidth of the power supply 100. For example, in one embodiment, the controller 140 varies a magnitude of a resistance provided by the current flow controller 145 between 10 millohms and 500 milliohms (or other suitable values).

Thus, as previously discussed, further embodiments herein include, via the controller 140, varying a control loop bandwidth of the respective power supply 100 including multiple power converter phases. In one embodiment, control of the flow of current 135 through the series circuit path 160 includes controlling a resistive component setting (such as in current flow controller 145) disposed in series with the series circuit path 160; a resistive setting of the current flow controller 145 controls a magnitude of the current 145 through the series circuit path 160. In one embodiment, the current flow controller 145 is implemented via switch in parallel with a resistor (such as a 500 milliohm resistor or other suitable value). Activation of the switch causes the resistance provided by current flow controller 145 to be around 10 milliohms. Deactivation of the switch causes the current flow controller 145 to be around a value of the resistor.

In such an instance, the control loop bandwidth of power converter phases is inversely proportional to a magnitude of the resistive component (such as current flow controller 145). For example, a reduction in a magnitude of the resistive component (such as current flow controller 145) increases a magnitude of the control loop bandwidth; an increase in a magnitude of the resistive component (such as current flow controller 145) decreases a magnitude of the control loop bandwidth.

Graph 800 in FIG. 8 below shows the loop bandwidth variation with respect to the parallel resistance value in the range of [10 mΩ, 500 mΩ]. The loop bandwidth is reduced by almost 5 times when the parallel resistance is increased from 10 mΩ to 500 mΩ.

Figure 8:
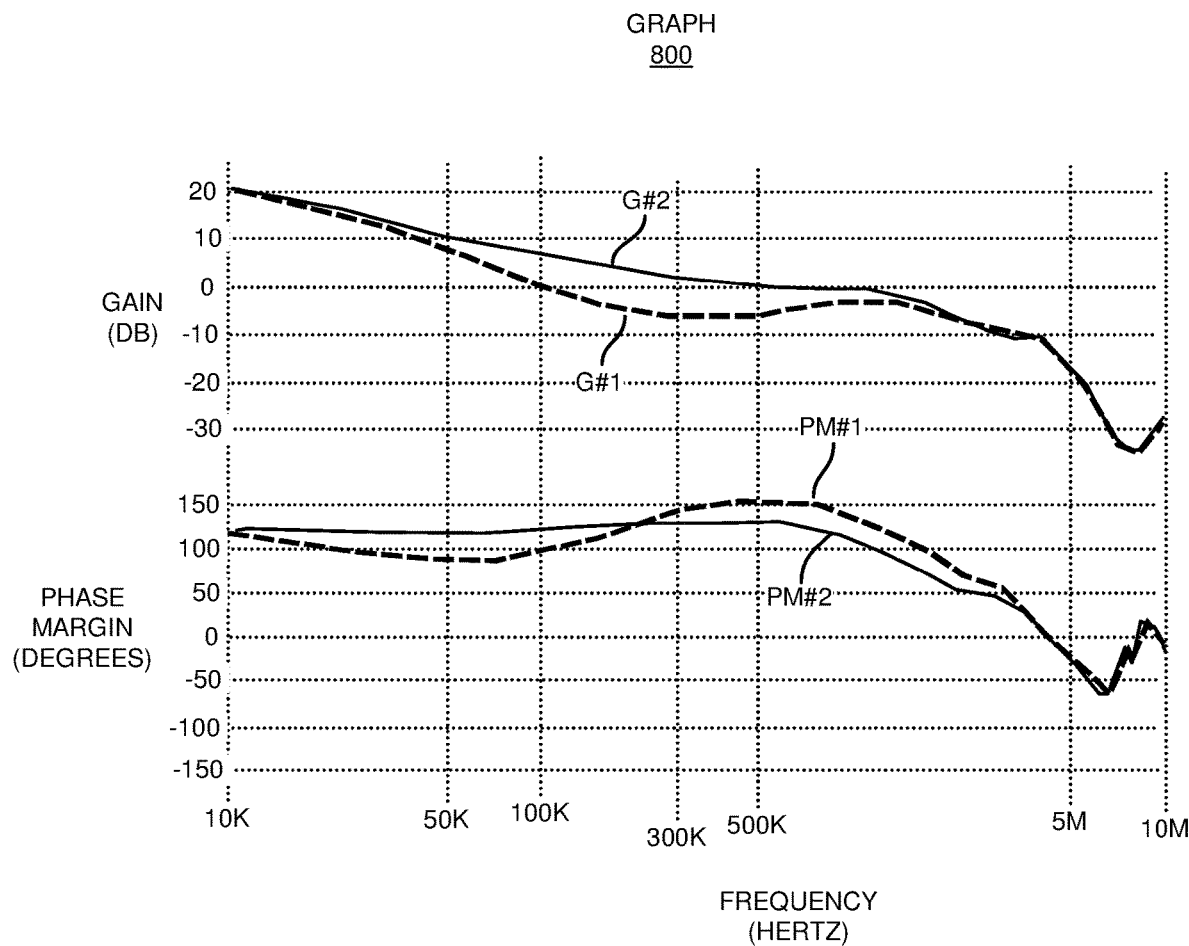
FIG. 8 is an example graph illustrating gain and phase margin for different current flow control settings of a series circuit path according to embodiments herein.

FIG. 8 is an example graph illustrating gain and phase margin for different current flow control settings according to embodiments herein.

As previously discussed, the current flow controller 145 (such as a variable resistance controlled by the controller 140) can be configured to modulate the loop bandwidth in combination with a resistor or RL network in parallel or other suitable combination of resources. When the current flow controller 145 is in full conduction, such as via a closed switch, the current flow controller 145 is a low resistance and the total Lc loop resistance (such as 10 milliohm) is the lowest, therefore loop bandwidth is the highest. When the series current flow controller 145 is set to a higher resistance, such as 500 milliohm), the loop bandwidth is higher. The loop bandwidth is inversely proportional to the resistance value.

Graph 800 shows the loop bandwidth variation with respect to the resistance value provided by the current flow controller 145 in the range of [10 mΩ, 500 mΩ]. The loop bandwidth is reduced by almost 5 times when the resistance of the current flow controller 145 is increased from 10 mΩ to 500 mΩ. Graph 800 illustrates multiple different RLC settings of the series circuit path according to embodiments herein.

For example, a first setting of the series circuit path 160 (when the resistance of the current flow controller 145 is =500 milliohms) results in gain curve G #1 and a corresponding gain crossover frequency of 101.53 KHz; the first setting (RLC=500 milliohms) of the series circuit path 160 also results in phase curve PM #1.

As further shown, a second setting of the series circuit path 160 (when the resistance of the current flow controller 145 is =10 milliohms) results in gain curve G #2 and a corresponding gain crossover frequency of 101.53 KHz; the second setting (RLC=10 milliohms) of the series circuit path 160 also results in phase curve PM #2.

Figure 9:
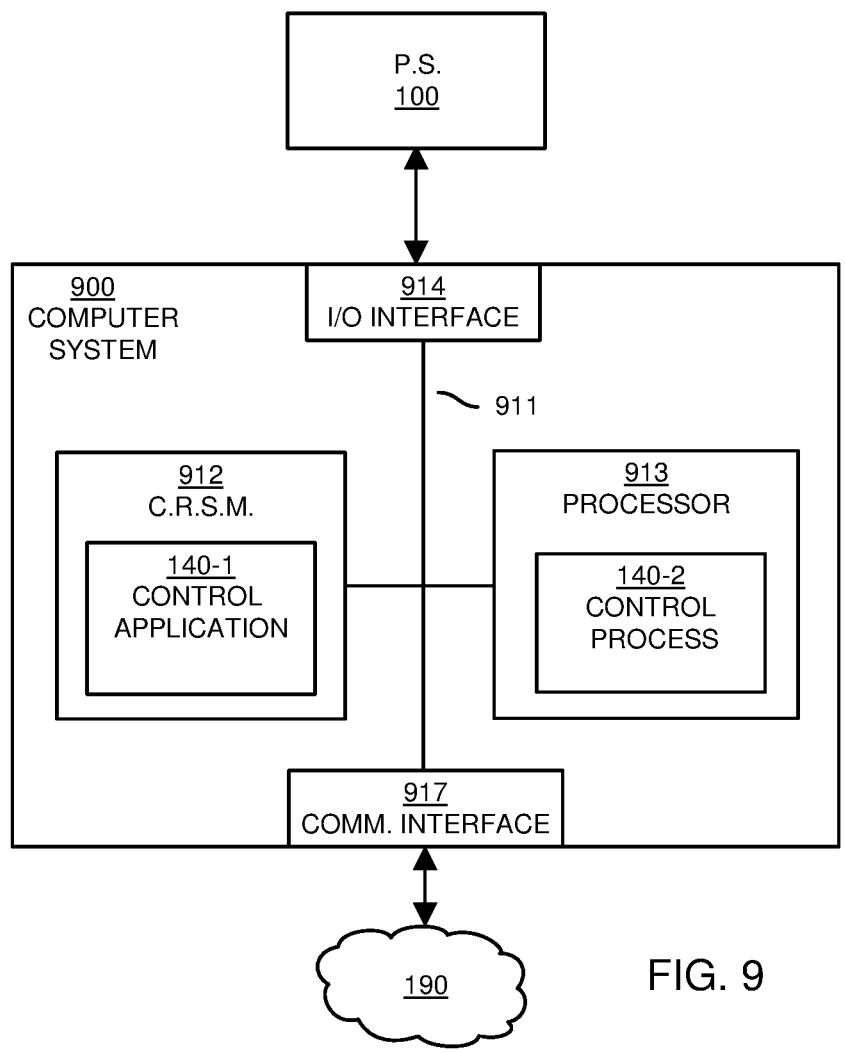
FIG. 9 is an example diagram illustrating computer processor hardware and related software instructions that execute methods according to embodiments herein.

FIG. 9 is an example block diagram of a computer device for implementing any of the operations as discussed herein according to embodiments herein.

As shown, computer system 900 (such as implemented by any of one or more resources such as controller 140, current monitor 240, etc.) of the present example includes an interconnect 911 that couples computer readable storage media 912 such as a non-transitory type of media (or hardware storage media) in which digital information can be stored and retrieved, a processor 913 (e.g., computer processor hardware such as one or more processor devices), I/O interface 914 (e.g., to output control signals to the power converter phases, monitor current, etc.), and a communications interface 917.

I/O interface 914 provides connectivity to any suitable circuitry such as power supply 100 and corresponding power converter phases 121, 122, 123, etc.

Computer readable storage medium 912 can be any hardware storage resource or device such as memory, optical storage, hard drive, floppy disk, etc. In one embodiment, the computer readable storage medium 912 stores instructions and/or data used by the controller application 140-1 to perform any of the operations as described herein.

Further in this example embodiment, communications interface 917 enables the computer system 900 and processor 913 to communicate over a resource such as network 190 to retrieve information from remote sources and communicate with other computers.

As shown, computer readable storage media 912 is encoded with controller application 140-1 (e.g., software, firmware, etc.) executed by processor 913. Controller application 140-1 can be configured to include instructions to implement any of the operations as discussed herein.

During operation of one embodiment, processor 913 accesses computer readable storage media 912 via the use of interconnect 911 in order to launch, run, execute, interpret or otherwise perform the instructions in controller application 140-1 stored on computer readable storage medium 912.

Execution of the controller application 140-1 produces processing functionality such as controller process 140-2 in processor 913. In other words, the controller process 140-2 associated with processor 913 represents one or more aspects of executing controller application 140-1 within or upon the processor 913 in the computer system 900.

In accordance with different embodiments, note that computer system 900 can be a micro-controller device, logic, hardware processor, hybrid analog/digital circuitry, etc., configured to control a power supply and perform any of the operations as described herein.

Functionality supported by the different resources will now be discussed via flowchart in FIG. 10. Note that the steps in the flowcharts below can be executed in any suitable order.

Figure 10:
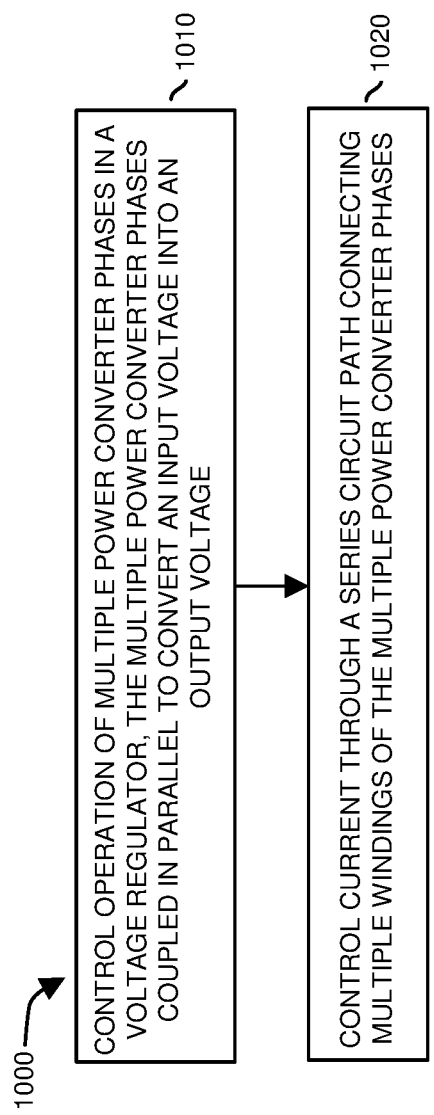
FIG. 10 is an example diagram illustrating a method according to embodiments herein.

FIG. 10 is an example diagram illustrating a method of controlling a power converter according to embodiments herein.

In processing operation 1010, the controller 140 controls operation of multiple power converter phases 121, 122, 123, etc., in a voltage regulator (power supply 100). The multiple power converter phases are coupled in parallel to convert an input voltage 111 (Vin) into an output voltage 133 (such as Vout).

In processing operation 1020, the controller 140 controls a magnitude of the current 135 through a series circuit path 160 connecting multiple windings 221, 222, 223, etc., of the multiple power converter phases 121, 122, 123, etc.

Figure 11:
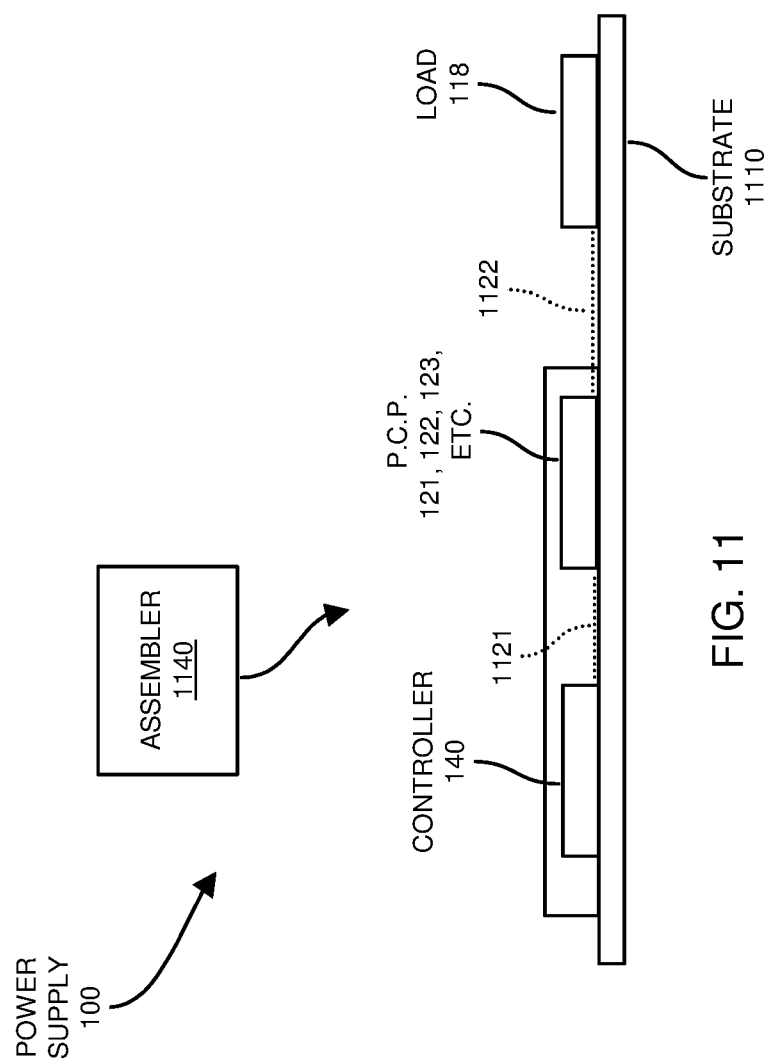
FIG. 11 is an example diagram illustrating assembly of a circuit according to embodiments herein.

FIG. 11 is an example diagram illustrating assembly of a power supply and multiple interconnected power converter phases on a circuit board according to embodiments herein.

In this example embodiment, assembler 1140 receives a substrate 1110 and corresponding components of power supply 100 to fabricate controller 140, power converter phases 121, 122, 123, etc. The assembler 1140 affixes (couples) the controller 140 and other components such as associated with the power converter phases, switches, etc., to the substrate 1110.

Via respective circuit paths 1121 as described herein, the assembler 1140 provides connectivity between the power converters, controller 140, etc. Note that components such as the controller 140, power converter 121, load 118, etc., can be affixed or coupled to the substrate 1110 in any suitable manner. For example, one or more of the components in power supply 100 can be soldered to the substrate 1110, inserted into sockets disposed on the substrate 1110, etc.

Note further that the substrate 1110 is optional. Any of one or more circuit paths or connectivity as shown in the drawings and as described herein can be disposed in cables or other suitable medium.

In one nonlimiting example embodiment, the load 118 is disposed on its own substrate independent of substrate 1110; the substrate of the load 118 is directly or indirectly connected to the substrate 1110 via wires, cables, links, etc. The controller 140 or any portion of the power supply 100 and corresponding power converter phases can be disposed on a standalone smaller board plugged into a socket of the substrate 1110 as well.

Via one or more circuit paths 1122 (such as one or more traces, cables, connectors, wires, conductors, electrically conductive paths, etc.), the assembler 1140 couples the power supply 100 and corresponding power converter phases to the load 118. In one embodiment, the circuit path 1122 conveys the output voltage 123 generated by the power converter phases to the load 118.

Accordingly, embodiments herein include a system comprising: a substrate 1110 (such as a circuit board, standalone board, mother board, standalone board destined to be coupled to a mother board, host, etc.); a power supply system 100 including corresponding components as described herein; and a load 118 (such as a motor, winding, etc.).

Note that the load 118 can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 1110 or disposed at a remote location.

Note again that techniques herein are well suited for use in circuit applications such as those that implement feedback monitoring. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
a controller operative to:
control operation of multiple power converter phases in a voltage regulator, the multiple power converter phases coupled in parallel to convert an input voltage into an output voltage;
control a flow of current through a series circuit path connecting multiple windings of the multiple power converter phases, wherein the current passes through each of the multiple windings in the series circuit path; and
wherein the controller is further operative to: i) monitor a magnitude of the current through the series circuit path connecting the multiple windings, and ii) in control the flow of the current through the series circuit path based on the magnitude of the monitored current.

2. The apparatus as in claim 1, wherein control of the current through the series circuit path connecting the multiple windings of the multiple power converter phases includes control of a magnitude of a resistive component disposed in series with the series circuit path.

3. An apparatus comprising:
a controller operative to:
control operation of multiple power converter phases in a voltage regulator, the multiple power converter phases coupled in parallel to convert an input voltage into an output voltage; and
control a flow of current through a series circuit path connecting multiple windings of the multiple power converter phases;
wherein the controller is operative to: i) monitor a magnitude of the current through the series circuit path connecting the multiple windings, and ii) control the flow of the current through the series circuit path based on a magnitude of the monitored current; and
wherein the controller is operative to reduce the flow of current through the series circuit path connecting the multiple power converter phases in response to detecting that the magnitude of the monitored current through the series circuit path is greater than a threshold value.

4. The apparatus as in claim 1, wherein the windings are first windings of the multiple power converter phases connected in series, each of the multiple power converter phases including a primary winding and a secondary winding; and
wherein each of the secondary windings of the multiple power converter phases is operative to, based on control signals from the controller, contribute to produce output current that collectively generates the output voltage.

5. The apparatus as in claim 1, wherein the windings are transformer windings; and
wherein the controller is operative to control the current through the series circuit path via switch circuitry disposed in series with the series circuit path connecting the multiple transformer windings.

6. An apparatus comprising:
a controller operative to:
control operation of multiple power converter phases in a voltage regulator, the multiple power converter phases coupled in parallel to convert an input voltage into an output voltage;
control a flow of current through a series circuit path connecting multiple windings of the multiple power converter phases, wherein the current passes through each of the multiple windings in the series circuit path;
wherein the windings are transformer windings;
wherein the controller is operative to control the current through the series circuit path via switch circuitry disposed in series with the series circuit path connecting the multiple transformer windings; and
wherein setting of the switch circuitry to an open circuit state is operative to decouple operation of the multiple power converter phases with respect to each other.

7. An apparatus comprising:
a controller operative to:
control operation of multiple power converter phases in a voltage regulator, the multiple power converter phases coupled in parallel to convert an input voltage into an output voltage;
control a flow of current through a series circuit path connecting multiple windings of the multiple power converter phases, wherein the current passes through each of the multiple windings in the series circuit path; and
wherein the controller is further operative to vary a control loop bandwidth associated with the multiple power converter phases based on control of a resistive component disposed in series with the series circuit path, a setting of the resistive component controlling a magnitude of the current through the series circuit path.

8. The apparatus as in claim 7, wherein the control loop bandwidth is inversely proportional to a magnitude of the resistive component.

9. The apparatus as in claim 7, wherein a reduction in a magnitude of the resistive component increases a magnitude of the control loop bandwidth.

10. An apparatus comprising:
a controller operative to:
control operation of multiple power converter phases in a voltage regulator, the multiple power converter phases coupled in parallel to convert an input voltage into an output voltage;
control a flow of current through a series circuit path connecting multiple windings of the multiple power converter phases, wherein the current passes through each of the multiple windings in the series circuit path; and
wherein the controller is further operative to reduce the flow of current through the series circuit path of the multiple windings in response to a condition in which a magnitude of output current supplied by the output voltage to power a load is below a threshold value.

11. The apparatus as in claim 10, wherein the controller is further operative to:
implement first PID (Proportional-Integral-Derivative) settings in a PID controller that controls a first power converter phase of the multiple power converter phases prior to reducing the flow of current through the series circuit path connecting the multiple windings; and
implement second PID (Proportional-Integral-Derivative) settings in the PID controller of the first power converter phase subsequent to reducing the flow of current through the series circuit path connecting the multiple windings.

12. A method comprising:
controlling operation of multiple power converter phases in a voltage regulator, the multiple power converter phases coupled in parallel to convert an input voltage into an output voltage;
controlling current through a series circuit path connecting multiple windings of the multiple power converter phases; and
wherein the current passes through each of the multiple windings in the series circuit path;
the method further comprising:
monitoring a magnitude of the current through the series circuit path connecting the multiple windings;
controlling the current through the series circuit path based on the magnitude of the monitored current.

13. The method as in claim 12, wherein controlling the current through the series circuit path connecting the multiple windings of the multiple power converter phases includes controlling a magnitude of a resistive component disposed in series with the series circuit path.

14. The method as in claim 12 further comprising:
reducing the flow of current through the series circuit path connecting the multiple power converter phases in response to detecting that the magnitude of the monitored current through the series circuit path is greater than a threshold value.

15. The method as in claim 12, wherein the windings are first windings of the multiple power converter phases connected in series, each of the multiple power converter phases including a first winding and a second winding; and
wherein each of the second windings of the multiple power converter phases is operative to, based on application of a respective control signal, produce output current contributing to generation of the output voltage.

16. The method as in claim 12, wherein the windings are transformer windings, the method further comprising:
controlling the current through the series circuit path via operation of a switch disposed in series with the series circuit path connecting the multiple transformer windings.

17. The method as in claim 16 further comprising:
setting the switch to an open circuit state, the open circuit state operative to decouple operation of the multiple power converter phases with respect to each other.

18. The method as in claim 12 further comprising:
varying a loop bandwidth associated with the multiple power converter phases based on control of a resistive component disposed in series with the series circuit path to control a magnitude of the current through the series circuit path.

19. The method as in claim 18, wherein the loop bandwidth is inversely proportional to a magnitude of the resistive component.

20. The method as in claim 18, wherein a reduction in a magnitude of the resistive component increases a magnitude of the loop bandwidth.

21. The method as in claim 12 further comprising:
reducing the flow of current through the series circuit path of the multiple windings in response to detecting a condition in which a magnitude of output current supplied by the output voltage to power a load is below a threshold value.

22. The method as in claim 21 further comprising:
implementing first PID (Proportional-Integral-Derivative) settings in a PID controller that controls a first power converter phase of the multiple power converter phases prior to reducing the flow of current through the series circuit path connecting the multiple windings; and
implementing second PID (Proportional-Integral-Derivative) settings in the PID controller of the first power converter phase subsequent to reducing the flow of current through the series circuit path connecting the multiple windings.

23. A system comprising:
a circuit substrate;
the apparatus of claim 1, the apparatus coupled to the circuit substrate; and
wherein the output voltage powers a load.

24. A method comprising:
receiving a circuit substrate; and
coupling the apparatus of claim 1 to the circuit substrate.

25. The apparatus as in claim 1, wherein the controller is operative to reduce the flow of current through the series circuit path connecting the multiple windings of the multiple power converter phases in response to detecting that a magnitude of the current through the series circuit path is greater than a threshold value.

26. The apparatus as in claim 1 further comprising:
a first switch including a first node and a second node, the first node of the first switch directly coupled to a ground reference voltage, the second node of the switch coupled to a first winding of the multiple windings.

27. The apparatus as in claim 26,
wherein the control of the flow of the current through the series circuit path includes control of the first switch between an ON-state and an OFF-state.

28. The apparatus as in claim 1 further comprising:
a first switch including a first node and a second node, the first node of the first switch directly coupled to a reference voltage, the second node of the first switch coupled to a first winding of the multiple windings in the series circuit path;
a second switch including a first node and a second node, the first node of the second switch directly coupled to the reference voltage, the second node of the second switch coupled to a second winding of the multiple windings in the series circuit path; and
wherein the control of the flow of the current through the series circuit path includes control of the first switch and the second switch between an ON-state and an OFF-state.

29. The apparatus as in claim 1, wherein the multiple windings include a first primary winding and a second primary winding, the apparatus further comprising:
a first secondary winding magnetically coupled to the first primary winding;
a second secondary winding magnetically coupled to the second primary winding; and
wherein the flow of current through the multiple windings in the series circuit path is operative to convey energy from the first secondary winding to the second secondary winding to generate the output voltage.

30. The apparatus as in claim 29, wherein a combination of first output current supplied through the first secondary winding and second output current supplied through the second secondary winding produces the output voltage.

31. The apparatus as in claim 1, wherein the multiple windings include a first winding, a second winding, and a third winding; and
wherein the current flowing through the series circuit path flows through each of the first winding, the second winding, and the third winding.

32. The apparatus as in claim 1, wherein the multiple windings include a first winding, a second winding, and a third winding;
    wherein the first winding includes a first node and a second node;
    wherein the second winding includes first node and a second node;
    wherein the third winding includes a first node and a second node;
    wherein the current flows from the first node of the first winding through the first winding and out of the second node of the first winding to the first node of the second winding;
    wherein the current flows from the first node of the second winding through the second winding and out of the second node of the second winding to the first node of the third winding; and
    wherein the current flows from the first node of the third winding through the third winding and out of the second node of the third winding.

33. The apparatus as in claim 32, wherein the series circuit path includes a switch controlled by the controller, the controller operative to control a magnitude of the current via a setting of the switch.

34. The apparatus as in claim 1, wherein the series circuit path connecting the multiple windings of the multiple power converter phases reduces an output inductance of the voltage regulator.

35. The apparatus as in claim 1, wherein the controller is operative to reduce the magnitude of the current through the multiple windings in the series circuit path in response to detecting an over current condition of producing an output current from the output voltage.

36. The apparatus as in claim 1, wherein the controller is operative to reduce a magnitude of the current through the series circuit path connecting the multiple windings in response to detecting a magnitude of combined output currents from the multiple power converter phases is below a threshold value.

37. The apparatus as in claim 1, wherein the multiple power converter phases include a first power converter phase, a second power converter phase, and a third power converter phase;
    wherein the multiple windings include a first winding, a second winding, and a third winding;
    wherein the first winding is disposed in the first power converter phase;
    wherein the second winding is disposed in the second power converter phase;
    wherein the third winding is disposed in the third power converter phase; and
    wherein the current through the series circuit path passes through each of the first power converter phase, the second power converter phase, and the third power converter phase.

* * * * *

UNITED STATES PATENT AND TRADEMARK OFFICE
CERTIFICATE OF CORRECTION

PATENT NO. : 11,876,445 B2  
APPLICATION NO. : 17/062819  
DATED : January 16, 2024  
INVENTOR(S) : Yong Zhou et al.

Page 1 of 1

It is certified that error appears in the above-identified patent and that said Letters Patent is hereby corrected as shown below:

In the Claims

Column 17 Claim 1, Line 14, delete "in"

Signed and Sealed this  
Nineteenth Day of March, 2024

Katherine Kelly Vidal  
*Director of the United States Patent and Trademark Office*